United States Patent
Krishna et al.

(10) Patent No.: US 9,262,170 B2
(45) Date of Patent: Feb. 16, 2016

(54) OUT-OF-ORDER CHECKPOINT RECLAMATION IN A CHECKPOINT PROCESSING AND RECOVERY CORE MICROARCHITECTURE

(75) Inventors: Anil Krishna, Cary, NC (US); Ganesh Balakrishnan, Apex, NC (US); Gordon B. Bell, Madison, WI (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 13/558,750

(22) Filed: Jul. 26, 2012

(65) Prior Publication Data

US 2014/0032884 A1 Jan. 30, 2014

(51) Int. Cl.
| | | |
|---|---|---|
| G06F 9/00 | (2006.01) | |
| G06F 9/44 | (2006.01) | |
| G06F 9/38 | (2006.01) | |
| G06F 11/14 | (2006.01) | |

(52) U.S. Cl.
CPC .......... *G06F 9/3836* (2013.01); *G06F 11/1407* (2013.01)

(58) Field of Classification Search
None
See application file for complete search history.

(56) References Cited

U.S. PATENT DOCUMENTS

| | | | | |
|---|---|---|---|---|
| 5,644,742 A | * | 7/1997 | Shen | G06F 9/3004 712/244 |
| 2005/0120191 A1 | * | 6/2005 | Akkary et al. | 712/217 |
| 2007/0186081 A1 | * | 8/2007 | Chaudhry | G06F 9/30181 712/214 |
| 2008/0120620 A1 | * | 5/2008 | Lett et al. | 718/103 |
| 2010/0274972 A1 | * | 10/2010 | Babayan et al. | 711/125 |
| 2011/0066831 A1 | * | 3/2011 | Blundell et al. | 712/228 |
| 2011/0264862 A1 | * | 10/2011 | Karlsson | G06F 9/3802 711/125 |
| 2012/0079245 A1 | * | 3/2012 | Wang et al. | 712/208 |
| 2012/0079246 A1 | * | 3/2012 | Breternitz et al. | 712/208 |
| 2012/0278596 A1 | * | 11/2012 | Tran | G06F 9/3838 712/228 |

OTHER PUBLICATIONS

"BranchTap: Improving Perfomance With Very Few Checkpoints Through Adaptive Speculation Control", Akl, et al., 2006; University of Toronto.
"Continual Flow Pipelines: Achieving Resource-Efficient Latency Tolerance", Srinivasan, et al., IEEE Computer Society, Nov.-Dec. 2004.
"Checkpoint Processing and Recovery: Towards Scalable Large Instruction Window Processors"., Akkary, et al., IEEE, 36th International Symposium on Microarchitecture (MICRO-36 2003).

\* cited by examiner

*Primary Examiner* — Michael Sun
(74) *Attorney, Agent, or Firm* — Law Offices of Ira D. Blecker, P.C.

(57) ABSTRACT

Reclaiming checkpoints in a system in an order that differs from the order when the checkpoints are created. Reclaiming the checkpoints includes: creating one or more checkpoints, each of which having an initial state using system resources and holding the checkpoints state; identifying the completion of all the instructions associated with the checkpoint; reassigning all the instructions associated with the identified checkpoint to an immediately preceding checkpoint; and freeing the resources associated with the identified checkpoint. The checkpoint is created when the instruction that is checked is a conditional branch having a direction that cannot be predicted with a predetermined confidence level.

21 Claims, 4 Drawing Sheets

Figure 1:
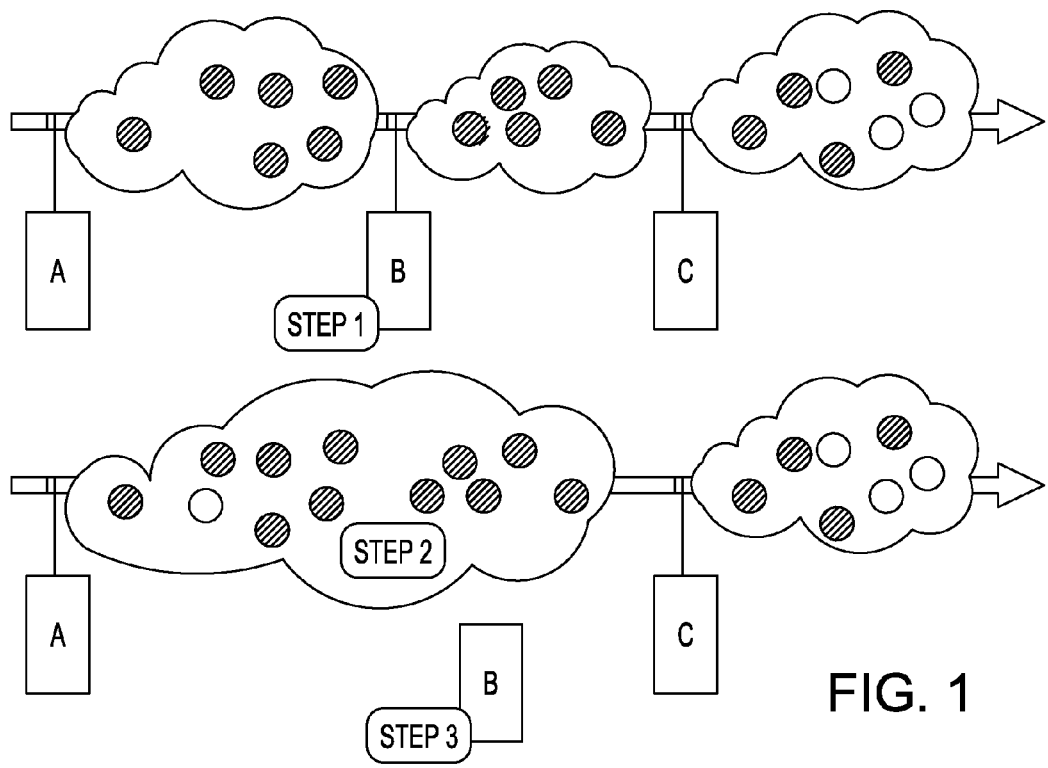

OUT-OF-ORDER CHECKPOINT RECLAMATION IN A CHECKPOINT PROCESSING AND RECOVERY CORE MICROARCHITECTURE

FIELD OF THE INVENTION

The invention relates to computer microprocessors, and more particularly, to microprocessors relying on checkpoint processing and recovery microarchitecture.

BACKGROUND AND RELATED ART

Microarchitecture, also referenced to as computer organization, is a way a given instruction set architecture (ISA) is implemented on a processor. The ISAs may be implemented with different microarchitectures. Implementations can vary due to different goals of a design or due to shifts in technology. The computer architecture is a combination of microarchitecture and instruction set design.

Re-Order Buffer (ROB) Based Processor Microarchitecture

Out-of-order (OoO) processing of instructions is an essential feature to achieve a high performance in a modern computer processor. All processors, including OoO processors, must maintain architectural correctness, i.e., instructions must update the architecturally visible state (logical registers and virtual memory associated with a software process) in the program order. If the processor actually executes instructions in an order that differs from the program order, then the results from the instruction must be stored in temporary locations until such time when the results can be committed in the program order to logical registers or memory.

A common approach to enable the out of order execution is through the use of physical registers that hold values computed OoO until they are ready to be written to an architected state. A compiler compiles a program using logical register names (also referenced as architected register names). A rename stage in the OoO processor pipeline converts the aforementioned logical register names in the compiled program to physical register names. Any true register dependencies are maintained during conversion, while any false dependencies, mainly introduced by the compiler due to a shortage of logical register names are removed. Thus, a Physical Register File allows instructions to not only execute OoO, but also to write back results temporarily. A mechanism also allows the processors to be safely speculative (branch prediction, value prediction, memory dependence prediction, and the like). In case where it is determined that the speculative values in the physical register file are incorrect, they can be safely removed and execution can be rolled back to a safer point (which may still differ from the architected state and may still remain speculative).

A key structure in most modern processors that manages the renaming of registers and rolling back the state upon mis-speculation (and exceptions) is referenced as Re-Order Buffer (ROB). Effectively, ROB maintains the information related to the instructions that are not yet committed to an architected state, that is, instructions which stand in a "speculation window". The ROB maintains the instruction information in the program order. This information essentially consists of logical and physical register names of each instruction source and destination operands. The size of ROB refers to the largest speculative window that the processor can form. Accordingly, if ROB has 128 entries, the processor can look at 128 instructions into the "future" in order to find instructions for an out of order execution. Alternatively, the ROB size restricts the scope within which the processor can search for Instruction Level Parallelism (ILP). Additionally, the ROB also enables the machine to a roll back state precisely to any of the instructions it contains. Thus, if a particular instruction is determined to be the start of mis-speculation (e.g. a mis-predicted branch) or an instance causing an exception (needing the state to be rolled back precisely to that instruction before executing an operating system trap) that ROB is capable of enabling. Such ability forces the ROB size and the PRF size to be closely related.

Assuming for simplicity that every instruction has a destination register, all the ROB instructions should be given distinct physical register names for their destinations. If two ROB instructions are given the same physical register for their destination, then, depending on the order in which the two instructions execute the physical register file will have a different state. Such uncertainty is not permitted. Therefore, as a rough approximation, for a 128 entry ROB, PRF should have 128 registers. In reality, there could be more registers to hold the committed logical register state, since the logical registers are typically not maintained in a separate register file. Assuming 32 logical registers, the PRF size will have to be 128+32=160 registers.

CPR Based Processor Microarchitecture

A fundamental problem with ROB based microarchitectures is the dependency to ROB and PRF size correlation. ROB cannot grow larger without a corresponding growing PRF. However, growing PRF can hurt the frequency. PRF is read by multiple execution lanes in the Register Read stage and written by multiple execution lanes in the write back stage of the pipeline. Assuming that each instruction reads two source operands and writes one destination operand and, further, assuming a four-way superscalar microarchitecture, it leads to 4*2=8 read ports and 4*1=4 write ports. That is, the PRF is a heavily ported structure. Since reading it in one cycle is critical to the performance, the size of the PRF can directly impact the cycle time (frequency) of the design. Therefore, even if application cycles per instruction are reduced (i.e., good) with a larger ROB, and if the cycles themselves grow longer, then the runtime and performance can actually worsen.

A solution to this problem is a Checkpoint Processing and Recovery (CPR) that enables the roll back state precisely to a given instruction. It only retains the ability to roll back the state to certain coarse grain locations in the application speculative window. However, in return, it gains a significant benefit of disengaging the speculative window size from the PRF size. CPR checkpoints state only applies at instructions to which the state may need to roll back (e.g., branches which were predicted without very high confidence). The state cannot be rolled back precisely to any other instructions in the speculative window. If a roll back is needed to a non-checkpointed instruction (e.g., when a branch predicted with high confidence resolves as mis-predicted), the state must be rolled back to the next older checkpoint first, and its execution restarted at the checkpoint (thereby, redoing some good work).

The main feature of CPR is that registers in the PRF can be reclaimed and reused without having to commit an instruction, referenced to as Aggressive Register Reclamation (ARR). In a ROB based microarchitecture, two instructions in the speculative window cannot have the same destination register. In a CPR based microarchitecture, two or more instructions in the speculative window can write to the same physical register. This is possible as soon as it is determined that the instruction that produces the value to be written to a logical register (referred hereinafter as a "producer"), all the instructions that consume that value (referred to hereinafter as the "consumer"), and the next instruction that produces a value to be written to the same logical register are located between two consecutive checkpoints (i.e., they do not straddle across any checkpoint). At this stage, it is determined that the consumers are completed the execution, and there is no reason to hold on to the physical register written to by the first producer (and consumed by the consumers). The physical register is guaranteed to have served its purpose. No future consumers need to be linked to the first production since there is a new production of the logical register that they must be linked to. Since all the current consumers have consumed the value, therefore, the physical register can be reused by another instruction in the speculative window even while the first instruction is still part of the speculative window.

While checkpointing enables Aggressive Register Reclamation for physical registers between two checkpoints, frequent checkpointing can hurt its potential because the physical registers which hold logical register values at the time of a checkpoint creation are "pinned". The registers cannot be reclaimed until the checkpoint and all the instructions associated thereto are committed. The physical registers are pinned because they hold an architected register state that will be needed if the execution state needs to roll back to the checkpoint.

Accordingly, in order to avoid frequent checkpointing, the CPR microarchitecture provides a checkpointing state only at the branches, and particularly only at low confidence branches. This allows tens or hundreds of instructions between two checkpoints, although an accurate count is dependent on the frequency of occurrence of low-confidence branches in a particular workload.

Accordingly, CPR can help grow the speculative window to hundreds or thousands of instructions while using only a regularly sized PRF (e.g., 160 entries) and maintaining a good clock frequency. Furthermore, the speculative window size adjusts dynamically to the program characteristics. Checkpoints are created more frequently when the application has a control flow that is difficult to predict. It causes the machine to run out of checkpointing resources or free physical registers before the speculative window becomes too large. This is acceptable since a very large speculative window will have most certainly ended, following a wrong control flow path (thereby, performing useless work, potentially polluting the TLB and caches) given that branches are difficult to predict. If, on the other hand, the application has a highly predictable control flow, then the checkpoints are created less frequently, allowing good register reclamation opportunity between checkpoints. Therefore, it enables a large speculative window prior to running out of checkpoint resources or physical registers.

The foregoing creates two problems that remain with the CPR. First, the decision to checkpoint at a particular instruction is irrevocable or final. Once the checkpoint is created, the checkpoint resource (i.e., the registers it pins) cannot be reclaimed until the checkpoint commits. Commits happen in the program order, potentially hundreds of cycles after the checkpoint was created. Therefore, checkpointing decision ties up the checkpoint resources for a long time. If the checkpoint was created at an instruction that would never require rolling back, then the checkpoint resources are used needlessly.

Furthermore, estimating the branch prediction confidence is difficult. In certain applications, the confidence mechanism may not work accurately. In such a case, a high confidence branch that was ignored by the checkpoint creation may mispredict, requiring the state to roll back to an older checkpoint, forcing to redo some of the work until reaching the branch in question. This is referred to as checkpoint overhead, and has been demonstrated to be a problem.

Placing checkpoints can be a difficult optimization problem. By placing checkpoints aggressively, e.g., one at each branch, the checkpoint overhead problem vanishes; it is guaranteed that a checkpoint exists for rolling back to any branch. However, this may lead to running out of either checkpoint resources or physical registers faster (recall that each checkpoint may pin some physical registers disallowing them from being reclaimed and reused). If, on the other hand, checkpoints are placed conservatively, e.g., only at low confidence branches, checkpoint overhead can become a significant problem.

Accordingly there is a need to find a solution that can take advantage of the CPR strength (aggressive register reclamation) while simultaneously overcoming any CPR weakness (lost performance due to the checkpoint overhead problem).

Figure 2:
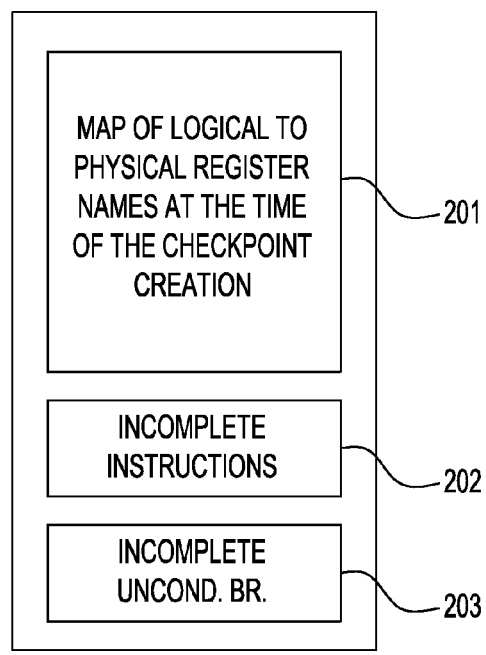
Figure 3:
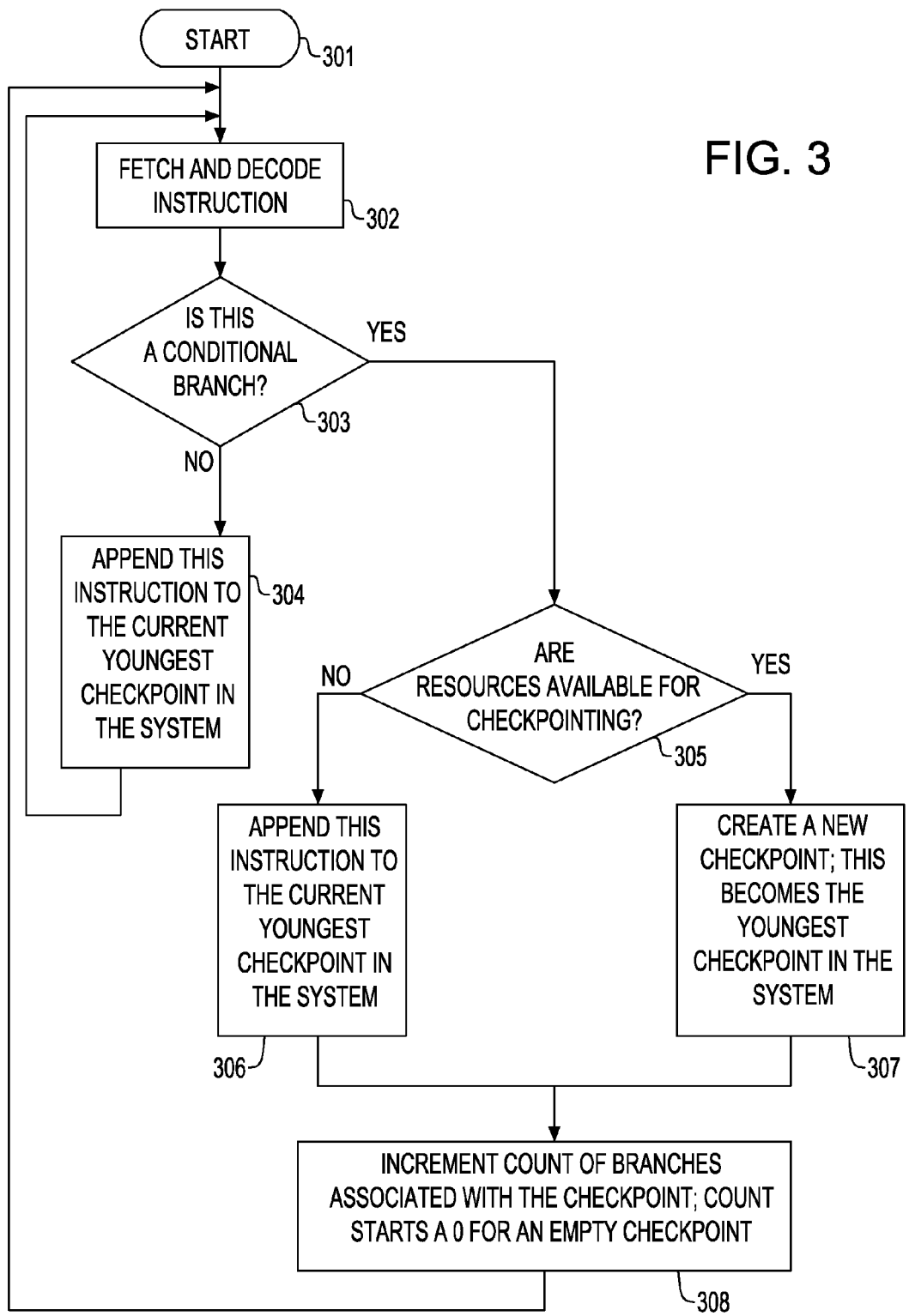

BRIEF DESCRIPTION OF THE DRAWINGS following detailed description of embodiments of the invention, taken in conjunction with the accompanying drawings of which:

FIG. 1 shows a diagram figuratively illustrating a basic inspect of an embodiment of the invention, the clouds representing a set of instructions associated with the checkpoint immediately to the left of the cloud; the shaded within each cloud representing completed instructions; and the unshaded circles representing incomplete instructions;

FIG. 2 is a diagram depicting the checkpoint creation and management illustrated by how when an instruction is renamed and dispatched, it takes one of two actions in a CPR microarchitecture, the instruction is either assigned to the current most recent checkpoint or the instruction causing the hardware to first create a new checkpoint to be then assigned to that checkpoint FIG. 3 is a flow chart illustrating an extreme case where the checkpoint is created at every conditional branch, irrespective of the prediction confidence he checkpoint creation policy, according to an embodiment of the invention.

Figure 4:
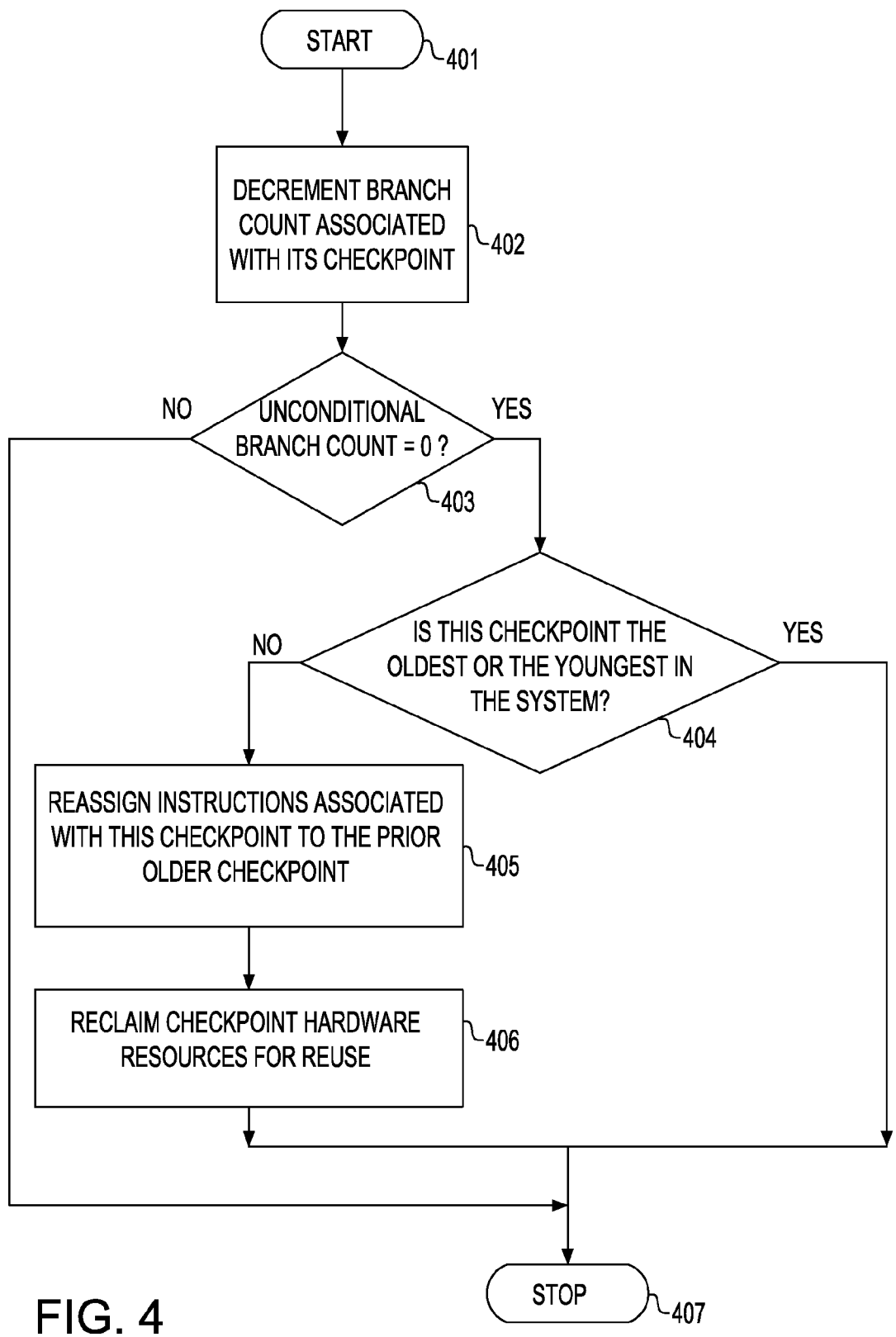
Figure 5:
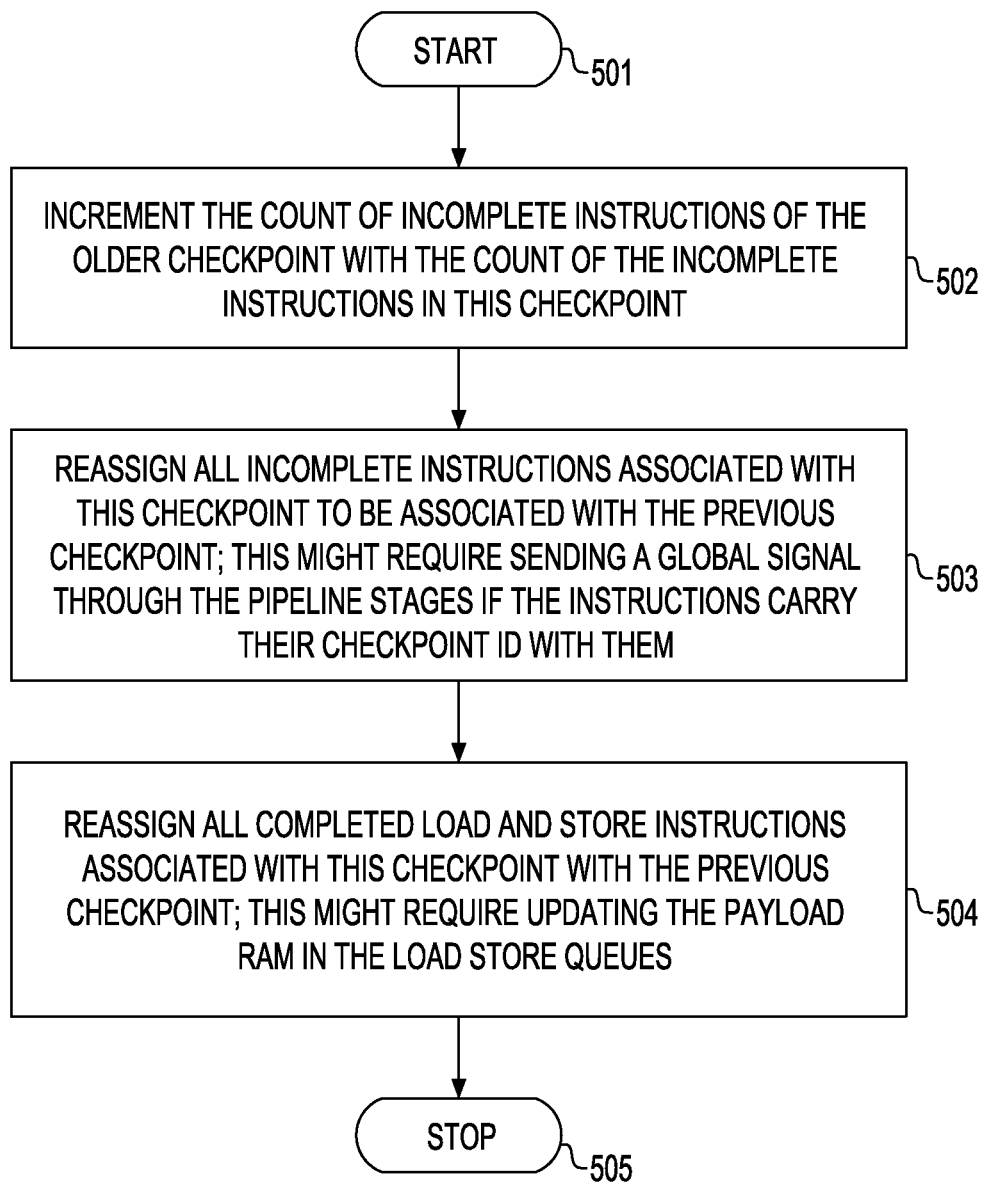

FIG. 4 is another flow chart depicting a checkpoint reclamation, according to an embodiment of the invention; and FIG. 5 is a flow chart illustrating the reassignment of instructions from a current checkpoint to an immediately preceding one, according to an embodiment of the invention.

SUMMARY

In one aspect, an embodiment of the invention provides a method for reclaiming checkpoints out of order, i.e., in an order that differs from the order when the checkpoints were created.

In another aspect, an embodiment enables checkpoint at each conditional branch, and not just low-confidence conditional branches.

In yet another aspect, an embodiment frees the checkpoint resources as soon as the conditional branch instruction that caused the checkpoint to be created is resolved.

In still another aspect, an embodiment provides a checkpoint allowed by the baseline CPR microarchitecture is extended to explicitly track the number of unresolved branches in addition to the number of incomplete instructions.

In still another aspect, a number of unresolved branches associated with a checkpoint are reduced to zero, the checkpoint resources permitted to be reclaimed, even when the number of incomplete instructions did not reach zero that would not be allowed by the baseline CPR.

In a further aspect, when checkpoint resources are reclaimed, the instructions associated with the checkpoint are reassigned to the next older checkpoint, differing from a baseline CPR where there is no notion of reclaiming a checkpoint that is not the oldest checkpoint in the system.

In yet a further aspect, a method is provided for reclaiming checkpoints out-of-order in a system that includes: creating one or more checkpoints, each of which having an initial state using system resources and holding the checkpoints state; identifying the completion of all the instructions associated with the checkpoint; reassigning all the instructions associated with the identified checkpoint to an immediately preceding checkpoint; and freeing the system resources associated with the identified checkpoint.

DETAILED DESCRIPTION

In one embodiment of the invention, a solution is provided that is based on two principles. Firstly, most instructions, including branches, complete the execution within a few cycles (at most a few tens of cycles) once they are fetched, decoded and renamed, preferably after being placed into a speculative instruction window. On the other hand, an instruction commit can span over hundreds of cycles if the instruction is stuck, e.g., behind a load miss to memory or other long latency operations. It is precisely for this reason that large speculative windows are required to extract Instruction Level Parallelism (ILP).

Secondly, a checkpoint bears two fundamental functions: rolling back the state upon detecting a mis-speculation and committing instructions in program order. The first function of the checkpoint is satisfied as soon as it can be guaranteed that there is no reason for executing a roll back to the checkpoint, which can be guaranteed as soon as all the branches associated with the checkpoint are resolved correctly. Generally, this happens in only a small number of cycles following the cycle after the branch instructions are renamed, i.e., while the instructions are still close to the leading edge of the speculative window. The second function of the checkpoint is not complete until a checkpoint commit occurs. The checkpoint commit (which is really the bulk commit of the instructions associated with the checkpoint) may only happen hundreds of cycles later, and after all the preceding instructions in the speculative window are committed. The first function of the checkpoint ends long before the second function is employed in order to reclaim the checkpoint as soon as its first function is completed, while passing on the second function to a different checkpoint of the system.

Referring to FIG. 1, an embodiment of the invention illustrates figuratively a basic inspect. Clouds representing the set of instructions associated with the checkpoint are depicted immediately to the left of the cloud. The shaded circles within each cloud represent complete instructions, while the unshaded circles represent incomplete instructions. The checkpoints are represented by rectangles A, B and C. The instruction window is represented by a thick arrow running across horizontally. Younger instructions are shown on the right. The checkpoint assignment occurs at the leading edge (right edge) of the speculative window, while the instruction retirement occurs at the trailing edge (left edge) of the speculation window. Two snapshots in time are illustrated, the first where a reclamation opportunity is detected (illustrated at the top of the diagram), while the second is depicted where the reclamation steps are performed (at the bottom of the diagram). For simplicity, FIG. 1 illustrates the case where the checkpoint is reclaimed only after all the instructions associated therewith are complete.

Still referring to FIG. 1, an embodiment identifies the checkpoint B that is no longer requires for mis-speculation recovery, i.e., when all the instructions associated with checkpoint B are complete (Step 1); reassigns the instructions from current checkpoint to the next older checkpoint, checkpoint B to checkpoint A (Step 2); and reclaims the hardware resources of the checkpoint, i.e., reclaims checkpoint B (Step 3). As each instruction is complete, it informs the checkpoint. The checkpoint then decrements its count of the incomplete instructions. A count reaching 0 is indicative that there are no more incomplete instructions left. The checkpoint will not be needed for rollback of the execution state. The checkpoint may therefore be reclaimed, as determined by Step 1. The instructions cannot be committed yet, i.e., their outputs which are stored in physical registers cannot be made architecturally visible just yet, since they are not the oldest instructions within the system. The instructions must be committed in the oldest to newest program order. Therefore, Step 2 takes the instructions associated with Checkpoint B and reassigns them to Checkpoint A, the next older checkpoint in the systems compared to Checkpoint B. This frees Checkpoint B resources to be reclaimed.

Referring now to FIG. 2, details of the contents of a checkpoint state will be described. The checkpoint contains, among others, pointers to the physical registers that contain the architected (logical) register values at the time of the checkpoint creation (201). This structure is labeled as a "Map of Logical to Physical Register names". Additionally, the checkpoint can also contain a counter that determines the number of incomplete instructions (202) associated with the checkpoint. The counter begins at 0, and is incremented when a new instruction is dispatched and assigned to the checkpoint. It is decremented by 1 whenever the instruction associated with the checkpoint is complete, enabling the checkpoint to detect when all the instructions associated thereto are completed. When all the instructions associated with the checkpoint are complete, the checkpoint is reclaimed.

A new counter is preferably maintained per checkpoint to track only the conditional branch instructions associated with the checkpoint. Though not strictly necessary, the optimization can improve the performance of the proposed scheme. The new counter reaches a count of zero when all the conditional branch instructions associated with the checkpoint are complete occurring prior to all the instructions associated with the checkpoint to be completed. Thus, the first counter may still be non-zero, while the second counter reaches zero. The counter reaching zero is indicative that there is no way that the execution is rolled back to the beginning of the checkpoint due to a branch misprediction—which is the most common reason for rolling back execution to a checkpoint. Therefore, instead of relying on the knowledge of completion of all the instructions, relying on the knowledge of completion of all conditional branches can help speed the process of indentifying which checkpoint is to be reclaimed.

Checkpoint Creation and Management

When an instruction is renamed and dispatched, it takes one of two actions in a CPR microarchitecture, the instruction is either assigned to the current most recent checkpoint or the instruction causing the hardware to first create a new checkpoint to be subsequently assigned to the checkpoint.

The policy that decides whether or not to create a new checkpoint at a particular instruction is referenced as the checkpoint creation policy. The default policy practiced by the prior art creates checkpoints only at low confidence conditional branches. The heuristic keeps the checkpoint frequency low, but as aforementioned, it can suffer from checkpoint overhead when non-checkpointed conditional branches are mis-predicted.

While embodiments of the invention benefit from the Checkpoint Creation Policy, preferably a more aggressive checkpoint creation policy is recommended. A spectrum of options can be used depending on the confidence level threshold employed to make the checkpoint creation decision.

Referring to FIG. 3, an extreme case is described where a checkpoint is created at every conditional branch, irrespective of the prediction confidence level. Doing this does not work with a baseline CPR. It only works when it is combined with part of the embodiment of the invention.

Assignment of an instruction to a checkpoint involves two actions. The checkpoint increments the count of the number of incomplete instructions associated with the checkpoint. In one embodiment, if the instruction is a conditional branch (303) it also increments the count of the incomplete conditional branches in the checkpoint. The instruction remembers which checkpoint was assigned which facilitates connecting the instruction to the appropriate checkpoint, such that when it is complete, it can inform the correct checkpoint of the completion.

When an instruction completes the execution, it decrements the incomplete instructions counter in its corresponding checkpoint (203). Additionally, if the instruction is a conditional branch (303) it also decrements the incomplete conditional branches counter in the checkpoint.

Still referring to FIG. 3, the Checkpoint Creation Policy is illustrated in the context of the checkpoint reclamation. When the instruction is complete and the incomplete-instruction count associated with the instruction checkpoint reaches zero, and the checkpoint is not the oldest or the most recent checkpoint in the system (305), the checkpoint may be reclaimed. In a preferred embodiment, the reclamation can happen as soon as the incomplete/conditional branches counter in the checkpoint reaches zero, provided that the checkpoint is not the oldest or the youngest checkpoint in the system.

Described hereinafter is a rationale behind the reclamation policy using the preferred embodiment. When all the conditional branches in the checkpoint complete correctly, the checkpoint is preferably not be used to roll back the speculative state. The state may have to roll back to an older or to a younger checkpoint, but never to the checkpoint. The only other scenario that may require the state to roll back to the checkpoint is if one of the incomplete instructions causes an exception. This can be addressed in one of two ways. First, given that exceptions are rare, it may be acceptable to lose the ability to roll back to the checkpoint, and instead roll back to the next older checkpoint (Note: it is guaranteed that an older checkpoint exists) (306). Secondly, the problem is resolved once the reclamation policy changes to reclaim the checkpoint after all its instructions are complete (i.e., the incomplete-instruction counter reaches zero).

The rationale behind why the checkpoint being reclaimed should not be the oldest or the youngest is described next. If the oldest checkpoint completes all its conditional branches or even all its instructions, it is not sufficient to reclaim the checkpoint immediately. Being the oldest checkpoint requires the additional function of committing a state. This primarily involves committing store data from the load store queue to the data cache in program order. If the youngest checkpoint completes all its conditional branches or even all its instructions, it is not sufficient to reclaim the checkpoint because it can still be receiving instructions. The counter reaching zero may only be a temporary phenomenon until a new instruction is dispatched.

When the conditional branches in a checkpoint are mis-predicted, it can preferably be handled by having the state rolled back to the closest checkpoint as soon as the mis-speculation is determined. The advantage with the preferred checkpoint creation policy (shown in FIG. 3) resides in that each conditional branch will create a checkpoint without having to lose the "good work" (it will only lose the "bad work" down the wrong path). The other implication of creating a checkpoint at each conditional branch is that there will be exactly one conditional branch within each checkpoint scope of instructions, and the unconditional-branches counter may be replaced by a single bit.

FIG. 4 shows a flowchart that describes when checkpoint reclamation is done. The step that recommends "Reassign instructions associated with this checkpoint to the prior older checkpoint" (405) is described in more detail with reference to the flowchart shown in FIG. 5.

Checkpoint Reclamation Mechanism

Check point reclamation is a process of freeing the hardware resources associated to a checkpoint such that the resources can be reused by the machine. In order to have the instructions associated with the checkpoint, it may have to be reassigned to the previous older checkpoint (ensuring that the checkpoint can only be reclaimed if it is not the oldest checkpoint. Therefore, there will always be an older checkpoint).

If all instructions associated with the checkpoint are complete, then the only instruction that needs to be associated with the older checkpoint is the load and store instructions preferably in the Load and Store Queue(s). The incomplete instructions counter need not be incremented in the older checkpoint since the newly associated instructions are all complete. If, on the other hand, a checkpoint is reclaimed as soon as all the conditional branches (there will be only one conditional branch per checkpoint with the preferred checkpoint creation scheme), then the other incomplete instructions must be reassigned to the older checkpoint by redoing both of the assignment steps previously described (405). The checkpoint counters must be appropriately incremented by the number of incomplete instructions, and the incomplete instructions payload must be changed such that they associate themselves with the older checkpoint (404).

Referring to FIG. 5, the reassignment of instructions from a current checkpoint to an older checkpoint is described. Primarily, it resolves both the problems associated with the current art and how to manage the checkpoints. Reclaiming checkpoints in an order different from their creation order makes it that the checkpoint assignment is neither irrevocable nor final. The decision of whether to checkpoint becomes less critical if the checkpoint is deemed to be incorrect (i.e., at a branch which ends being correctly predicted). Then, one can simply reclaim the resources as soon as the branch is executed. Typically, this may occur with a few tens of cycles (unless the branch itself is dependent on a long operation such as a load mis). The ability to reclaim checkpoints out of order allows to checkpoint at every conditional branch and, thus, completely eliminates the checkpoint overhead problem. There is no mispredicted branch without an associated checkpoint to roll back.

In another embodiment, the branch predictor confidence mechanism is no longer necessary. When the traditional Checkpoint Creation Policy is applied (checkpoint on a low confidence branch) and the stated reclamation policy is employed, a checkpoint freed out of order can additionally increase the distance between two checkpoints beyond the baseline, and enable even a more aggressive register reclamation than the baseline CPR. This is because the physical register names pinned by the checkpoint are freed in addition to the checkpoint hardware resources, whenever a checkpoint is reclaimed.

It has been shown that there is a way by which a checkpoint may be reclaimed once it is determined that it is no longer needed for its first function (i.e., rolling back the state upon a mis-speculation), as long as it carefully tosses its second function (i.e., committing state in program order) over to a prior checkpoint. Shown are details of how the mechanism can be implemented.

At the leading edge of the speculative window wherein the youngest instructions are, checkpoints are created at a very fast clip—perhaps every few instructions. The checkpoint pin register names can prevent effective register reclamation. In addition, the checkpoint resources themselves are being used up. However, a few cycles later most of the checkpoints begin to be freed because their instruction, at least the unconditional branches are complete. This returns the checkpoint resources back for use at the leading edge, as well as to "un-pin" the registers used by the checkpoint. Thus, a steady supply of checkpoints is maintained.

At the trailing edge of the speculative window, only a few checkpoints are employed, perhaps only those with a long latency operations, such as a load misses and their dependents. This enables a more dynamic and optimal distribution of checkpoint resources to points in the speculative window that needs the checkpoints, rather than a static and irrevocable decision at the dispatch time. It is foreseen that the present technique can be used to making the speculative window even larger than the baseline, or to avoid the checkpoint overhead, or perhaps both.

While the invention has been described in accordance with certain preferred embodiments thereof, those skilled in the art will understand the many modifications and enhancements which can be made thereto without departing from the true scope and spirit of the invention, which is limited only by the claims appended below.

What is claimed is:

1. A method for reclaiming checkpoints out-of-order in a system comprising:
   a) using a computer, creating at least one checkpoint, each checkpoint having an initial state using system resources and holding the checkpoint state;
   b) identifying completion of all instructions associated with the at least one checkpoint;
   c) upon completion of all instructions associated with the at least one checkpoint, reassigning all the instructions associated with the at least one checkpoint to a previous older checkpoint;
   d) reclaiming the checkpoint resources once all instructions associated with the checkpoint are reassigned to the previous older checkpoint; and
   e) freeing the system resources associated with the at least one checkpoint.

2. The method as recited in claim 1 wherein the at least one checkpoint is created when the instruction that is fetched is a conditional branch.

3. The method as recited in claim 2 wherein creating at least one checkpoint further comprises creating a plurality of checkpoints and wherein the plurality of checkpoints are created at every conditional branch irrespective of a predetermined confidence level at every conditional branch.

4. The method as recited in claim 2 wherein a solution frees checkpoint resources as soon as the conditional branch instruction having caused the checkpoint to be created is resolved.

5. The method as recited in claim 1, further comprising checkpoint hardware and physical registers pinned to the checkpoint.

6. The method as recited in claim 3 further comprising tracking a number of unresolved branches associated with the checkpoint.

7. The method as recited in claim 6 wherein as each of the instructions is completed, the checkpoint is informed and the checkpoint decrementing its count of incomplete instructions.

8. The method as recited in claim 7 wherein when no further incomplete instructions are left, reclaiming the checkpoint.

9. The method as recited in claim 1 further comprising assigning an instruction to a checkpoint comprising incrementing the checkpoint count of a number of incomplete instructions corresponding to the checkpoint.

10. The method as recited in claim 9, wherein when the instruction is a conditional branch, it increments a count of incomplete conditional branches in the checkpoint, wherein when completed, it informs the corresponding checkpoint about the completion.

11. The method as recited in claim 8, wherein the checkpoint reclamation freezes hardware resources associated with the checkpoint, enabling a reuse of the resources of the system.

12. The method as recited in claim 11 wherein the checkpoint reclaiming occurs after ensuring that the older checkpoint exists.

13. The method as recited in claim 1 wherein said checkpoint further comprises a counter for determining a count of incomplete instructions associated with the checkpoint.

14. The method as recited in claim 13 wherein the counter increments its count when a new instruction is dispatched and assigned to the checkpoint, and decrements its count when an instruction associated with the checkpoint is completed, enabling the checkpoint and detects when all the instructions associated with the checkpoint are complete.

15. The method as recited in claim 12, further comprising reclaiming the checkpoint when all the instructions associated with the checkpoint are complete.

16. The method as recited in claim 12, wherein the reclaiming the checkpoint is achieved in an order different from its creation order.

17. The method as recited in claim 1 wherein subsequent to reassigning all the instructions associated with the at least one checkpoint to the previous older checkpoint, further comprising committing all the instructions in program order.

18. A method for reclaiming checkpoints out-of-order in a system comprising:
   a) using a computer, creating at least one checkpoint, each checkpoint having an initial state using system resources and holding the checkpoint state;
   b) identifying completion of instructions associated with the at least one checkpoint, at least one of the instructions being for a conditional branch;
   c) upon completion of the at least one conditional branch instruction associated with the at least one checkpoint, reassigning all the instructions associated with the at least one checkpoint to a previous older checkpoint even if some instructions are incomplete so long as the at least one conditional branch instruction is complete; and d) reclaiming the checkpoint resources once all instructions associated with the checkpoint are reassigned to the previous older checkpoint; and
e) freeing the system resources associated with the at least one checkpoint.

19. The method as recited in claim 18 further comprising tracking a number of unresolved branches associated with the at least one checkpoint wherein when the number of unresolved branches associated with the at least one checkpoint is reduced to zero, the checkpoint resources are reclaimed even if a count of incomplete instructions has not reached zero.

20. The method as recited in claim 18 wherein the at least one checkpoint further comprises a first counter for determining a count of incomplete instructions associated with the at least one checkpoint and a second counter reaches zero when all the conditional branch instructions associated to the checkpoint are complete and which occurs before the first counter reaches zero, wherein the reassigning all the instructions associated with the at least one checkpoint to a previous older checkpoint occurs when the second counter reaches zero.

21. The method as recited in claim 18 wherein creating at least one checkpoint further comprises creating a plurality of checkpoints and wherein the plurality of checkpoints are created at every conditional branch irrespective of a predetermined confidence level of every conditional branch.

* * * * *